United States Patent [19]

Pascoe

[11] Patent Number: 4,606,664
[45] Date of Patent: Aug. 19, 1986

[54] CONTROL OF MOVEMENT OF PRINTING BASE LINE

[75] Inventor: Robert A. Pascoe, Austin, Tex.

[73] Assignee: International Business Machines Corporation, Armonk, N.Y.

[21] Appl. No.: 584,580

[22] Filed: Feb. 29, 1984

[51] Int. Cl.⁴ .................. B41J 11/40; B41J 11/42; B41J 19/96
[52] U.S. Cl. .................................. 400/904; 400/65; 340/724
[58] Field of Search .............. 400/904, 65, 16–18; 340/724, 731

[56] References Cited

U.S. PATENT DOCUMENTS

| 3,738,472 | 6/1973 | Willcox | 400/904 |
| 3,927,752 | 12/1975 | Jones et al. | 400/904 |
| 4,037,705 | 7/1977 | Martin et al. | 400/904 |
| 4,195,338 | 3/1980 | Freeman | 340/724 |

FOREIGN PATENT DOCUMENTS

| 2505736 | 11/1982 | France . | |
| 163688 | 9/1983 | Japan | 400/904 |
| 1282558 | 7/1972 | United Kingdom | 400/904 |

OTHER PUBLICATIONS

Heath, "Adapter for Half-Line Space Control", IBM Technical Disclosure Bulletin, vol. 19, No. 5, pp. 1539-1541, 1076.
IBM Technical Disclosure Bulletin, vol. 9, No. 11, Apr. 1967, p. 1578, R. S. Heard et al., "Text Composition with Numerous Accents".

Primary Examiner—William Pieprz
Attorney, Agent, or Firm—J. H. Barksdale

[57] ABSTRACT

A method of, and system for, efficiently managing a temporary base line move operation to obtain an aesthetically pleasing and understandable equation and sub/super-script printout, and avoid excessive keying and indexing calculations. A single control is built based on an established base line. Included in the control are direction of move and magnitude of move from the established base line to the temporary base line. Following printing on the temporary base line, the control can be used to return to the established base line. The major advantages are limited coding, the magnitude of the move is independent of line spacing, and a return to the established base line can be without knowledge of the move magnitude.

4 Claims, 11 Drawing Figures (A)(B)(C)(REVERSE INDEX)(2)(FORWARD INDEX)(D)(E)(F)
FIG. 1
PRIOR ART
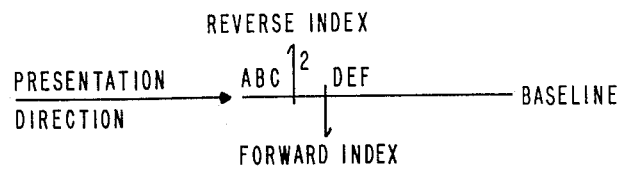
FIG. 2
PRIOR ART
FIG. 3
PRIOR ART
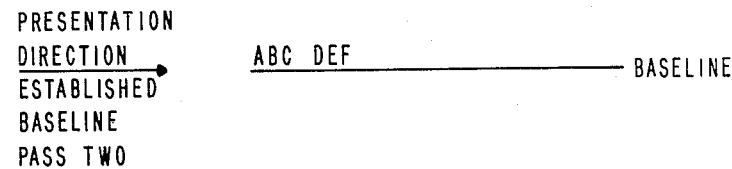
FIG. 4
PRIOR ART
$$AB = \frac{D^2 + C}{E + F}$$
FIG. 5
$$AB = \frac{D2 + C}{\cancel{E + F}}$$
FIG. 6

| TEMPORARY BASE LINE MOVE OP CODE | DIRECTION<br>—UP<br>—DOWN<br>—RETURN | MAGNITUDE<br>0 → MAX | PRECISION<br>—ON<br>—OFF |
|---|---|---|---|

CONTROL OF MOVEMENT OF PRINTING BASE LINE

1. Technical Field

This invention relates generally to indexed text presentations, and more specifically to a method of, and system for, controlling movement away from, and a return to, an established text presentation base line.

2. Background Art

Sub-/superscript and equation presentation as basic concepts are old and well known. However, control of these types of presentations has not been very well handled in the past. This is because control has to a large degree been both operator defined and established around physical constraints of a printer, a group of printers, or other class of presentation device(s) intended to be used. A simple example is superscripting. If the input device in use has reverse indexing capabilities by one half line increments and a single superscript is to be one and one half indexes above the printing line, no real problems are encountered. This is so as long as a compatible presentation device is to be used. The operator simply keys in 3 reverse indexes, the desired character, 3 indexes, and continues keying the remainder of the line. The presentation data stream is structured as keyed, and the presentation device presents the text as input. If on the other hand a presentation device having one fourth line reverse indexing is intended, system conversion to 6 reverse indexes is readily manageable. Management is also readily handled if the indexing capabilities of the intended presentation device are limited to the forward direction only. The reverse indexes required for superscripting may be simulated either by creating the line with multiple passes, or by a font change or special font requirement. In multiple pass creation of a text line, the superscript character would be presented on the first pass and the remainder of the line would be presented on the next pass. In creating the line with a font change, the superscript character is presented by a font having a character of smaller point size and elevated on the font. Of course, no font change is required if the font meeting the special font requirement is already installed on the presentation device.

FIG. 1 illustrates a normal data stream which is created based on a standard operator keying sequence to obtain a superscripted line. FIG. 2 illustrates a presentation of the line obtained from the data stream of FIG. 1. FIG. 3 illustrates creation of the line in multiple passes. Finally, FIG. 4 illustrates a presentation of the line using a special font and/or character substitution brought about by a font change. The arrows in FIGS. 1–4 are for indicating direction of printing, etc., and indexing.

Conversion and obtaining a desired presentation become much more troublesome in the area of equation representation. Consider a lengthy and complicated indexed numerator, itself including sub- and superscripts. The most severe problem here is that the operator is likely to lose all recollection of the location of the original base line. Another problem is that the operator may have no knowledge, due to the type of input device being used, of how far above a base line a particular superscript was ultimately indexed. For example, using a keyboard/display workstation with all points addressable (APA) display capabilities, placement and replacement can be by trial and error and changed many times to obtain an aesthetically pleasing layout. Yet another problem is that even if there is system building of a data stream based on operator input, the data stream will likely end up cluttered and excessively lengthy. This is often the case when an equation is constructed with a versatile keyboard/display system and a screen print operation is called for to obtain a presentation on an output or presentation device. Yet another problem is that not all presentation devices are capable of presenting a complex equation in an intended manner due to limitations of the presentation process and/or device. This is without regard to whether ultimate presentation is to be single or multi-pass. That is, many printers and other presentation devices on the market today have the capability of taking an input data stream and reformatting the data stream to meet the needs, requirements and/or limitations of the devices. With this capability, there is a presentation, but the presentation may not appear as intended as shown in FIG. 5. Instead, there may be an undesirable presentation as shown in FIG. 6. The obvious problems in FIG. 6 are that the numerator/denominator divider line created from underscore characters appears at the established base line, and the presentation device has only supported one level of superscription. In supporting only one level, the superscript "2" is presented at the same level as the "D". An error message would have been more appropriate than the FIG. 6 presentation.

The above is prior art primarily in a background sense, and as such, falls short of either anticipating or rendering the instant invention obvious. More specifically, the instant invention presents advances over any known prior art in that a base text line is established and can be returned to without regard to prior indexing both during input keying and output presentation, a single control is built based upon input keying to control output presentation, and the resulting single control can be used independent of the presentation device or can be structured to require specific presentation requirements. The advantages of these advances are that an operator does not have to keep track of indexing for return to an established base text line, a compact data stream for output presentation is built in an efficient manner, and the resulting presentation data stream may be used independently of presentation devices, as well as specify specific device requirements.

DISCLOSURE OF THE INVENTION

A unique method of, and system for, handling text presentations involving moves from, and returns to, an established base line are provided in order to reduce operator attention and build an efficient presentation data stream which is independent of presentation techniques and devices. At the beginning of each line, a base line is established. Based on moves from this established base line for handling equations, and sub-/superscripting, a control sequence can be built including (a) direction and magnitude of the moves, and (b) returns, without regard to the formatting characteristics of the text such as line spacing, or the characteristics of the intended presentation device such as an absence of reverse indexing capabilities. The control sequence, when built, is for ultimately controlling a text presentation with a minimum of data stream coding.

BRIEF DESCRIPTION OF THE DRAWING

FIG. 1 illustrates a normal data stream which is built based on standard operator keying methods and techniques.

FIG. 2 illustrates a presentation based on the data stream of FIG. 1 utilizing reverse and forward indexing capabilities of a presentation device.

FIG. 3 illustrates creation of the presentation of FIG. 2 utilizing multiple presentation passes in the place of indexing.

FIG. 4 illustrates the presentation of FIG. 2 created by using a special font or from font changing operations.

FIG. 5 illustrates a desired presentation of a superscripted equation.

FIG. 6 illustrates a presentation of the equation of FIG. 5 by a device having limited capabilities.

BEST MODE FOR CARRYING OUT THE INVENTION

General Description and Definitions

For a general understanding of what is to be accomplished utilizing this invention, reference is again made to FIG. 5. In order to ultimately obtain a quality superscripted equation presentation as shown in FIG. 5, an operator will key to a keyboard/display workstation. The workstation can be a standalone computing installation or system, a computing installation network keyboard/display terminal, etc., capable of presenting a visual response to the operator upon keying on the keyboard. Included in the system will be a printer for printing the keyed in and displayed equation. Also included in the system will be means for building a data stream for causing display and ultimate printing based on input keying.

While superscripting is primarily referred to, the method and system of this invention are equally applicable to subscripting.

The display included in the system will preferably be an all points addressable cathode ray tube type display. The printer included in the system will preferably be a limited all points addressable printer such as an ink jet printer, a matrix type impact printer, etc. However, a golf ball or daisy wheel printer would suffice, but on occasion may require some font changing.

In the following description reference will be made alternatively to established base line and established presentation base line. What is referred to here is the line upon which all presented characters, other than those such as a "p" having distenders, sit. The location of this line relative to other base lines on a page depends on the line spacing determined by either the operator or the system. For example, the printed lines may be 1/6 inches apart and this will be the line spacing. Once a new line has been started or located for printing, the system is structured to remember the base line for this new line. This is regardless of the extent of indexing or temporary base line moves. The temporary base line is a new or reestablished base line spaced from the established base line and upon which characters are to sit following a base line move operation. By presentation device is meant a printer, display, etc. While presentation is referred to in terms of printing in the preferred embodiment, this is for purposes of illustration only.

Figures 10, 11:
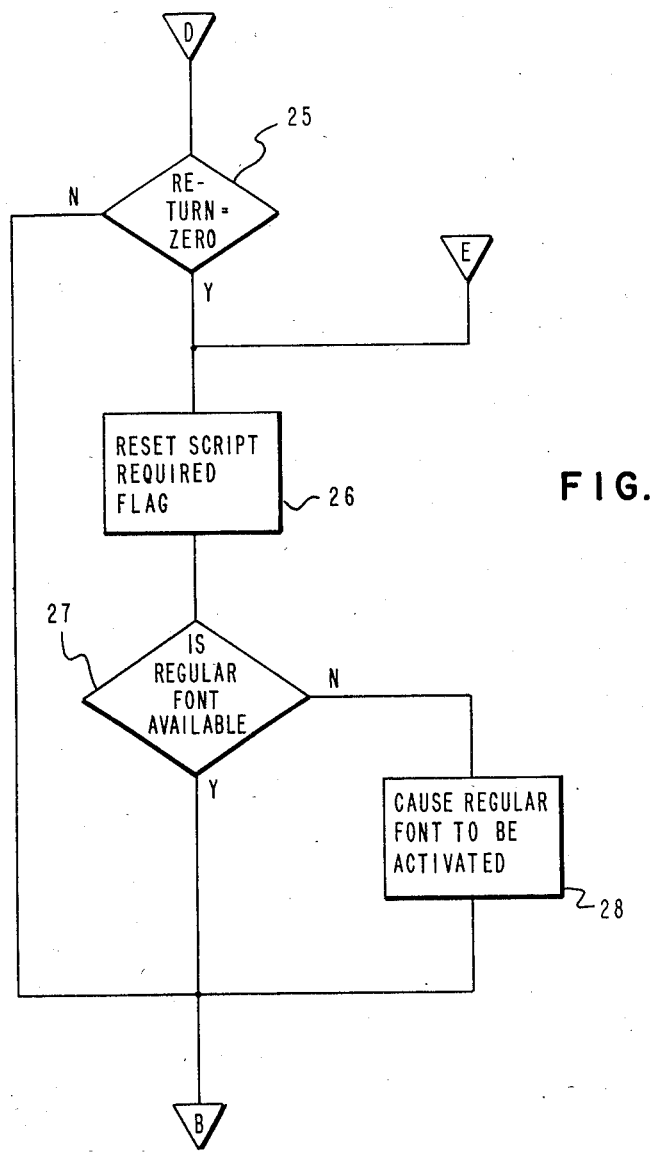
FIG. 11 is a pictorial representation of the data stream format for handling moves away from an established base presentation line.

For causing printing along the temporary base line, a single data stream control or control sequence is built. For purposes of this application the control sequence will include a temporary base line move control which in turn includes the magnitude of the temporary base line move, and a direction indication of up, down or return, and character codes. Refer to FIG. 11 for a representation of the temporary base line move control. Included in the temporary base line move control sequence can also be a precision code. The precision code is to separate aesthetics from physical characteristics. That is, a half indexed up 10 point character corresponding to the point size of the majority of the remainder of the characters included in the font being used may be desired rather than a five point superscript. Of course, it is to be appreciated that the precision code may be used to require a font change. It is a requirement that if precision is specified and the presentation device can not perform the requested base line move, an error indication be generated. A direction of up indicates base line movement in the superscript direction. A direction of down indicates base line movement in the subscript direction. A direction of return is for causing a return to the established base line. The magnitude expresses the distance from the current base line position to the desired base line position. The units of magnitude can be those of the APA device thus allowing placement of the base line in units unrelated to the fixed line density of the presentation. This allows greater flexibility in placement of the base line.

Referring again to FIG. 6, there is illustrated the effect of printing based on normal and well known operator techniques of input keying and system data stream creation when there has been no regard for the presentation device to be used. This undesireable example can be avoided with existing techniques and systems, but for the most part, excessive operator keying, time, and manipulation are required. With the instant invention, slight deviations from normal operator keying practice and thinking are required, and the system is structured to manage building or creation of the data stream for an aesthetically pleasing printout. The main points that an operator has to remember are the concepts of established base line and temporary base line moves, and that all returns are to the established base line.

Consider the following data stream representation:
(A)(B)(=)(TBM1, up, x units, precise)(D)(TBM2, up, y units, not precise)(2)(TBM3, down, y units, not precise)(+)(C)(bks)(bks)(bks)(bks)(—)(—) (—)(—)(TBM4, down, x+y units, precise)(bks)(bks) (bks)(E)(+)(F)(TBM5, return)

This data stream representation is a preferred data stream for representing the complex equation of FIG. 5. Five temporary base line move controls (TBM1, ... ) are used for causing variable magnitude moves. The data stream control sequence begins with the characters (A)(B) and (=) which are presented at the established base line. Next, the first temporary base line move control is encountered (TBM1, ... ). This control causes a move of the base line up the page by x units. Since precision is required by this control, the base line must be so moved by what ever technique available to the presentation device or an error message must be generated indicating that any resulting presentation will not be accurately represented. With the base line so elevated from the established base line, the character (D) is presented. Following this character, the second temporary base line move control (TBM2, ... ) is encountered. This control causes an upward move of the base line by y units. But since precision is not required in this control, the base line move may be simulated using the substitution of a smaller point sized character. Thus, when the character code (2) is encountered, this will be replaced by a "2" superscript as is the case in FIG. 5. Following the character (2) is the third temporary move control (TBM3, . . . ). There is a call for a downward movement of y units. Again, since precision is not required, this shift of base line will be simulated. Here, simulation is by causing regular point size characters to be presented. The data stream now contains the character (+) and (C) which are presented. Then four back spaces (bks) are encountered which causes a move of the presentation position back to the already presented "D". Then four underscore characters (_) are encountered which cause the divider line of the fraction to be presented. Next, a temporary base line move control (TBM4, . . . ) is encountered. This calls for a downward movement of x+z units. Since precision is required, the base line is moved down by a value of x+z. This in effect moves the base line to a position z units below the base line. Next, three backspaces (bks) are encountered which moves the presentation position to the left three units. Then the characters (E)(+) and (F) are encountered and presented. This is followed by the last temporary base line move control (TBM5, . . . ) which has no magnitude or precision specifications. This is since it calls for a return to established base line. Since the system has the capability of remembering the base line position relative to the established base line, the actual return movement of the base line can be effected. With the base line thusly repositioned, additional character processing may continue.

DETAILED DESCRIPTION

For a more detailed understanding of the invention, reference is next made to the flow diagram of FIGS. 7–10. This flow diagram is preferably implemented in the form of a computer application program. Operation is considered to begin at block 1 when a command is received for processing. A decision is made by logic block 2 to determine whether the command is a temporary base line move (TBM) command. If so, processing continues with logic block 3. If the command is not a TBM, operation continues in logic block 4. In logic block 4 a determination is made as to whether the command is one which causes a character to be presented. If so, processing continues in FIG. 9 with logic block 22. If not, no TBM process is called for and processing continues as indicated by block 5. The command is processed and operation continues in end block 18, and the next command may be processed.

If the command is a TBM, processing continues with logic block 3. In logic block 3 a determination is made as to the state of the precision bit. The precision portion of the control sequence can be either a bit which is either on or off, or a code which may or may not be included in the control sequence. For purposes of the following, it is to be assumed that precision is a bit which when on specifies that the equation is not to be altered by the presentation device. As was pointed out earlier, certain presentation devices have the ability to reformat a data stream for presentation. If the bit is turned on, reformatting is to be removed from consideration. This can be because the operator has determined that the risks of misrepresentation are high. If the operator specifies that the bit is to be off, this is based on a determination that the risks of misrepresentation are low. If the precision bit is on, a physical placement of the characters following the TBM is required to express the function associated with the TBM command. In this case, a determination is made by logic block 7 as to whether the presentation device has the capability to reverse index. If the device can not reverse index, processing continues with block 8 which causes an error message to be generated specifying that the TBM command can not be processed correctly. Thereafter, processing continues with logic block 9. In block 9, a decision is made as to whether to continue or not. If the decision is to not continue, processing is terminated by block 29. If the decision is to continue, processing continues with logic block 30 wherein additional decisions are made concerning the presentation device. If the presentation device can present sub- and superscript characters with the installed or an installable font, processing continues with logic block 19 in FIG. 8 for scripting preparation. This will be discussed in greated detail later herein. If the device cannot present the sub- and superscripts, processing is routed to block 18 in order for the next command to be prepared for processing. In this latter case, the determination was that the device could neither handle the TBM as required, nor handle the script character with a font change. The resulting presentation will result in the character(s) following the TBM being presented on the established base line.

As was pointed out earlier, some fonts can handle sub- and superscripting due to characters being higher or lower on the font. Generally, these higher or lower characters are of smaller point size than the normal text characters. An example of a smaller point in, size character is the numeral "2" in FIGS. 4 and 5.

If the determination in logic block 7 was that reverse indexing were possible, processing would continue with logic block 10 where a determination is made about the direction field of the TBM command. If the direction of the TBM control is up, processing continues with block 12. In block 12, a return value parameter is incremented by the magnitude value contained in the TBM command. The return value parameter is then the net distance and direction the base line is to be shifted away from its starting location, which is the established base line. Processing thereafter continues with block 13 where the actual base line position is moved up through reverse indexing, etc. by an amount equal to the magnitude in the TBM control. Processing will then continue in logic block 25 shown in FIG. 10. The determination in logic block 25 is about a final base line position. This will be discussed in greater detail later herein.

Figure 7:
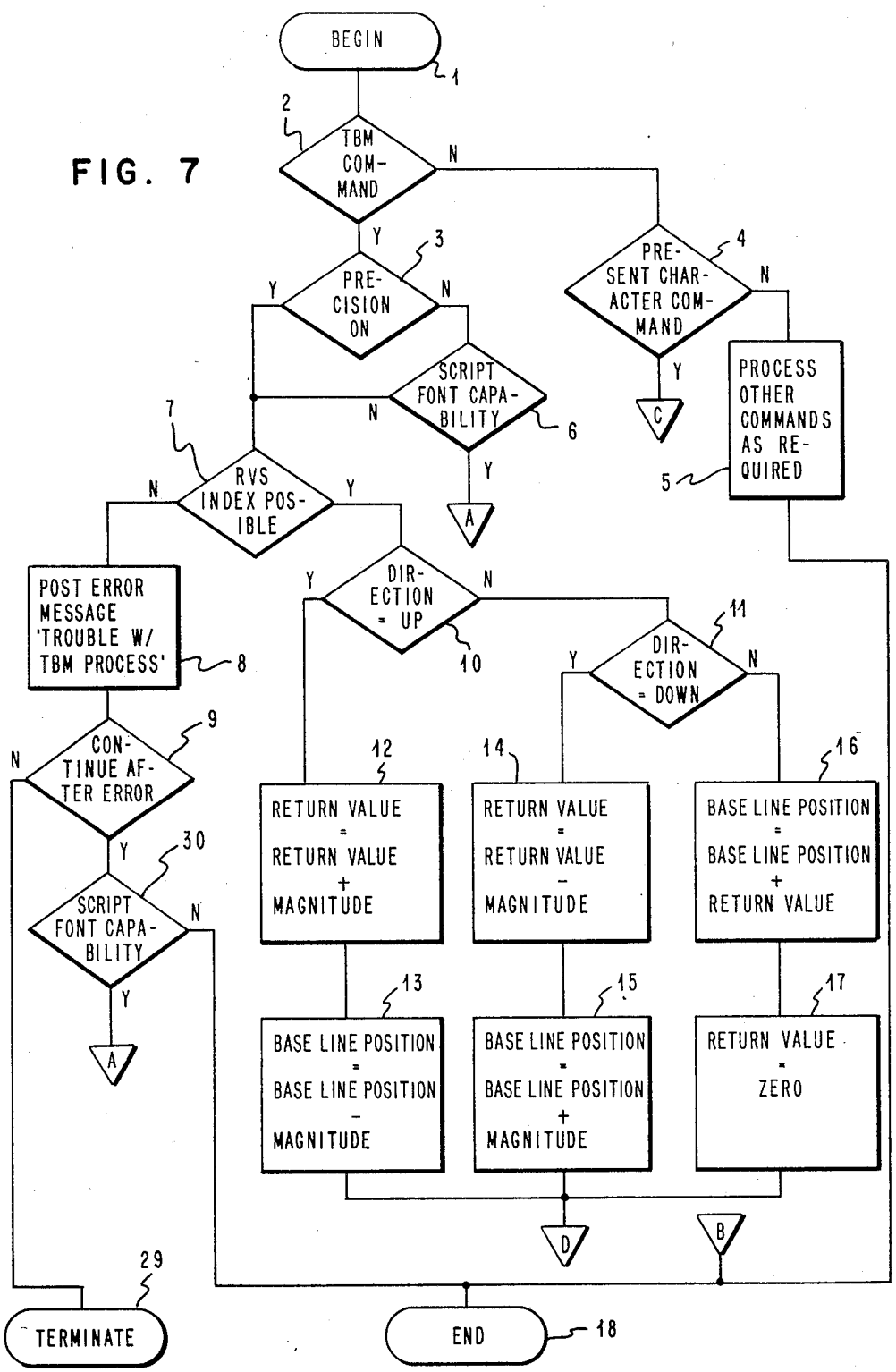
FIGS. 7 through 10 are flow charts illustrating the operations performed in preparing for a presentation of sub-/superscripted lines and equations.

If the direction field of the TBM control were not up as determined by logic block 10 in FIG. 7, processing would continue with logic block 11. In logic block 11, a determination would be made as to whether the direction field were down. If down, processing would continue with block 14 where the return value parameter is decremented by an amount equal to the magnitude value contained in the TBM command. This is the same return value parameter used in block 12. Again, this parameter specifies the net distance and direction the base line is shifted away from its starting location which is the established base line. Note that the return value contains a cumulative value. That is, if multiple TBM commands are processed, each specifying up or down directions, the return value parameter will include the net distance between the established base line and the actual base line. That is, if two TBM commands are processed having opposite directions and different magnitudes, the return value parameter will include the distance between the established base line and the actual base line. For example, if two TBM commands are processed having opposite directions and equal magnitudes, the return value parameter will contain a zero. This will indicate that the actual base line has been or is to be returned to the established base line position.

Following decrementing of the return value in block 14, processing continues with block 15 where the actual base line position is moved down, through by example, forward indexing by an amount equal to the magnitude in the TBM control. Processing will thereafter continue in logic block 25 in FIG. 10 for a determination about the final base line position. This will be discussed in greater detail later herein.

If the determination in logic block 11 is that the direction field is not down, it is assumed that the direction is such as to cause a return to the established base line. Processing then continues with block 16. In block 16, the actual base line position is changed by the value contained in the return value parameter. A positive value will cause a forward index, and a negative value will cause a reverse index. Therefore, the actual base line will be set to the established base line. Processing then continues with block 17 wherein the return value is set to zero. The actual base line is the line of present operation. If superscripting is taking place, the actual base line will be the temporary base line upon which the superscripted characters sit. If operation is on the established base line, the established base line will be the actual base line. Processing next continues with logic block 25 in FIG. 10 where a determination is made about the content of the return value parameter. If the return value is not zero, processing continues with block 18 in FIG. 7 and the next command may be prepared for processing. That is, following the adjustment to the actual base line in block 13, 15 or 16, the next data stream command is processed.

If the decision in logic block 25 is that the return value is zero, processing continues in block 26 where a script required flag is reset. This flag is used in the presentation process to determine if subscript or superscript character substitution is required. This will be discussed in greater detail later herein. The flag is reset here because the actual base line is the established base line. In this case no subscripting or superscripting is required.

Processing next continues in logic block 27 wherein a determination is made as to the availability of fonts to the presentation process. Since neither superscripting nor subscripting are required at this point, it must be assured that the available font will support regular characters. Thus, a determination is made in logic block 27 as to whether regular characters are available on the installed font. If so, processing continues in block 18 in order that the next command may be prepared for processing. By regular characters is meant characters used for presenting the bulk of the presentation. For most purposes, the "ABCDEF" in FIG. 4 would be termed regular characters. If the determination in logic block 27 is that regular characters are not available, processing continues in block 28 wherein the regular font is caused to be activated. Then, processing continues with block 18 in order that the next command may be processed.

If the determination in logic block 3, FIG. 7, had been that the precision bit had not been set or turned on, processing of the TBM command would be determined by the capabilities of the presentation device. In this case, processing would continue in logic block 6 wherein the scripting capabilities of the presentation device would be determined. If, it were determined that the device can not present scripted characters, processing would continue in logic block 7 as described earlier. That is, if reverse indexing is not possible, an error message or condition is posted or noted. If reverse indexing is possible, parameters are set and the base line position is moved in accordance with the TBM command. Scripted characters are those characters that are of smaller point size than regular characters and are presentable above or below the actual base line.

Figure 8:
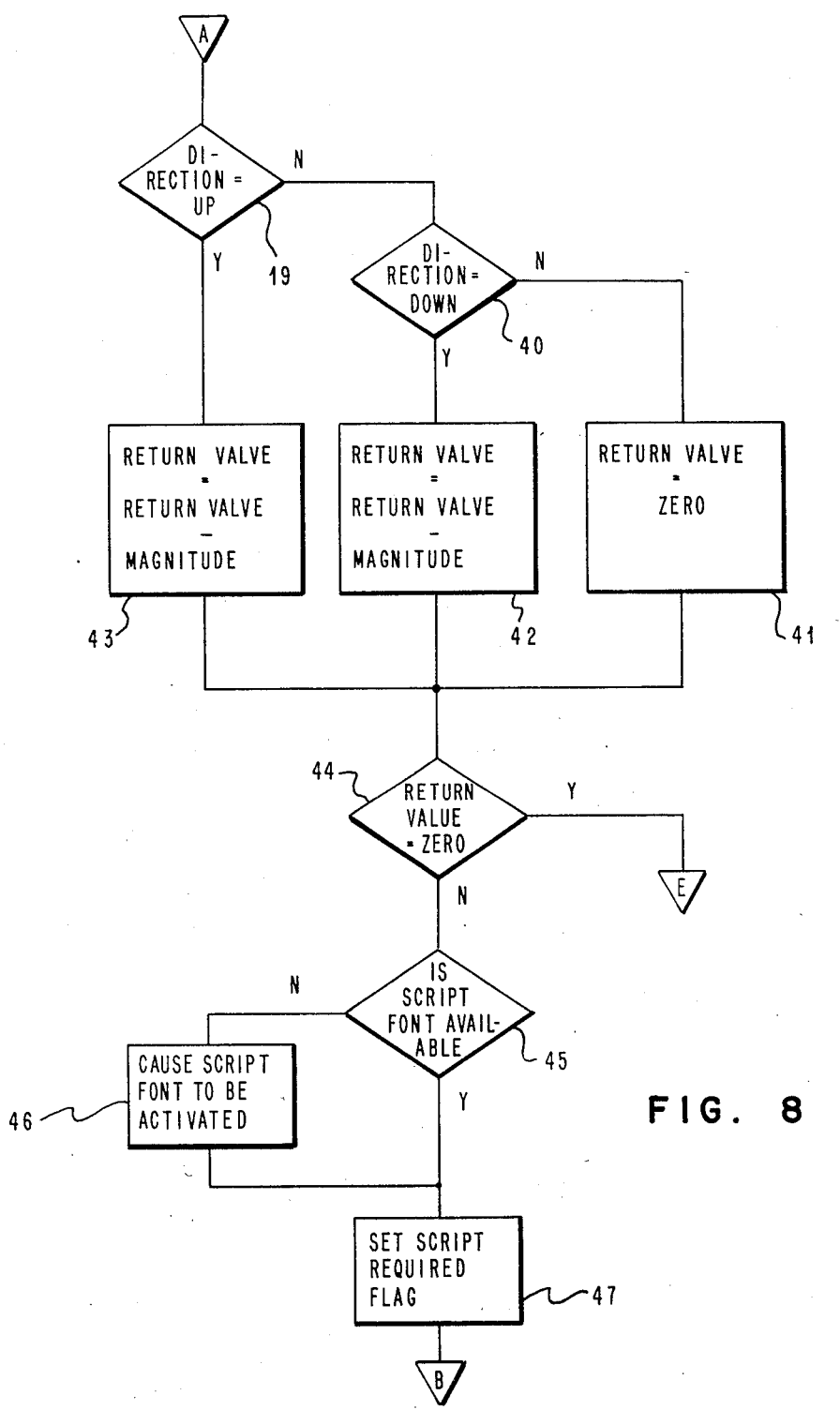
Figure 9:
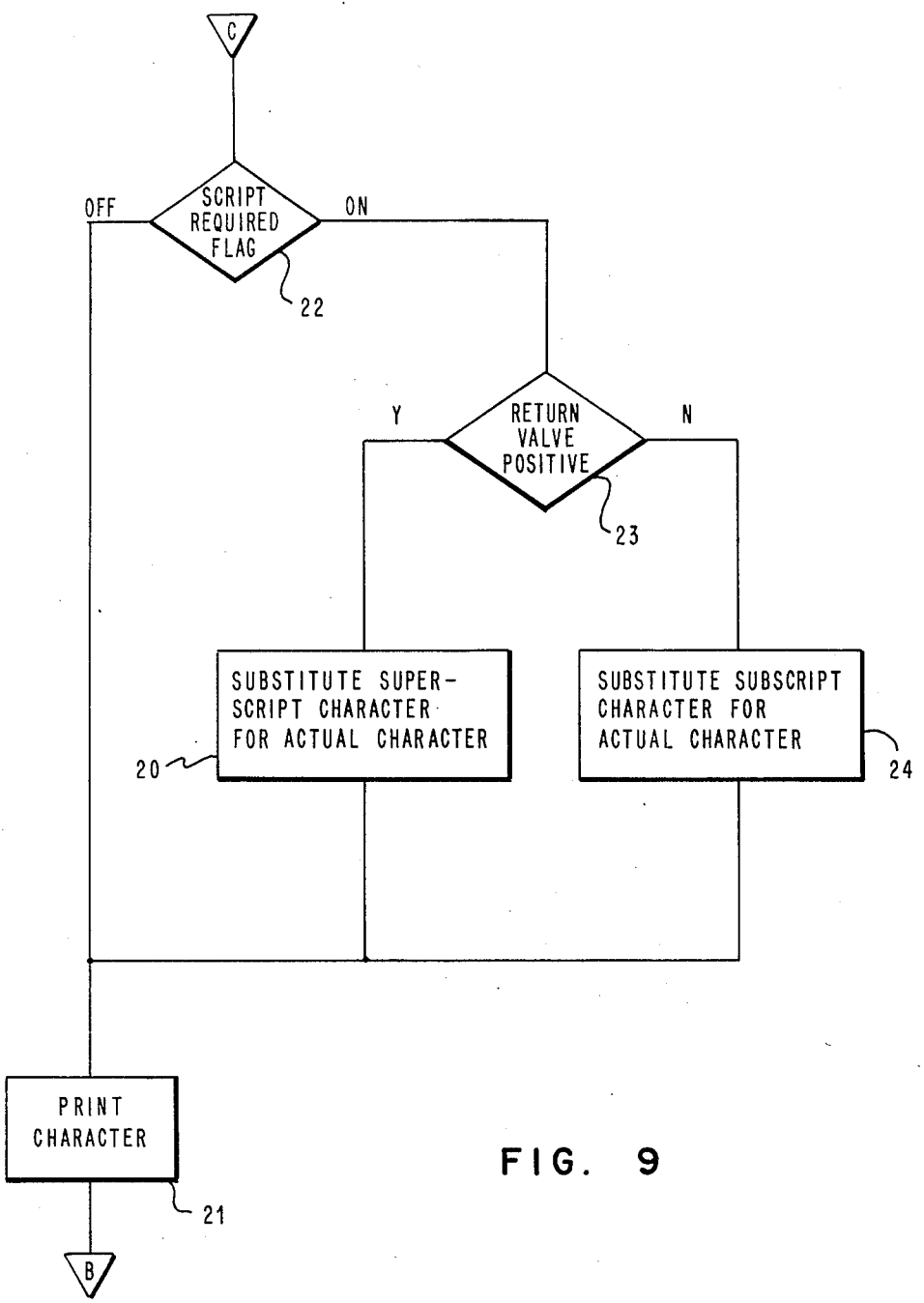

If it is determined in logic block 6 that the presentation device has scripting capability, processing continues in logic block 19 in FIG. 8. In logic block 19 a determination is made as to whether the value of the TBM direction represents up. If so, processing continues in block 43 wherein the value of the return value parameter is incremented by the magnitude of the TBM command. This operation is identical to the operation performed in block 12. If the direction is not up, processing continues in logic block 40 wherein a determination is made as to whether the value of the TBM direction represents down. If so, processing continues in block 42 wherein the value of the return value parameter is decremented by the magnitude of the TBM command. This operation is identical to that performed in block 14. If the determination in logic block 40 is that the direction is not down, it is assumed that the direction is to return to established base line. Processing is then in block 41 wherein the return value parameter is set to zero. This operation is identical to the operation in block 17. From the above, blocks 41, 42, and 43 perform the same function as blocks 17, 14, and 12 respectively, therefore providing the same control over the return value parameter. In this case, the return value parameter indicates whether the actual base line is different from the established base line. Now, rather than the physical base line shift that occurred in blocks 13, 15, and 16, a script character will be presented and an actual base line shift will be simulated. For this, the sign of the return value parameter indicates if a subscript or superscript character is required. A +(positive value) indicates a superscript, and a −(negative value) indicates a subscript.

Once the return value parameter has been adjusted via block 43, 42, or 41, processing continues in logic block 44. In logic block 44 a determination is made as to whether the return value parameter is zero. If zero, processing continues in blocks 26, 27, and 28 of FIG. 10, wherein as before, the script required flag is reset and the regular font is assured. This is since the actual base line is co-incident with the established base line and no subscript or superscript requirement is indicated.

If it is determined in logic block 44 that the return value parameter is not zero, this is an indication that the actual base line and the established base line are not co-incident. In this case, base line movement will be simulated by printing scripted characters. In this instance, processing continues in block 45 wherein a determination is made as to scripted character font availability. If a scripted character font is available, processing continues in block 47 wherein the script required flag is set. If a scripted character font is not available, processing continues in block 46 wherein a scripted font is activated. Thereafter, processing continues in block 47. Following operation in block 47, processing continues in block 18 of FIG. 7, and the next command may be processed.

This essentially completes the description of how the TBM command is processed. The base line has either been physically shifted, or flags have been established to substitute script characters to simulate a base line move. As to the flags, reference is again made initially to FIGS. 7 and 9 and blocks 4 and 22. The first operation is to determine the state of the script required flag. If it is off, as is the case if the actual base line is coincident with the established base line, or if the presentation device performs a physical base line shift for the TBM command, processing then continues in block 21 where the specified character is caused to be printed. If the script required flag is on, indicating that the base line shift is being simulated by printing a subscript or superscript character, processing continues in block 23. In logic block 23, the sign of the return value parameter is determined. If positive, processing continues in block 20 wherein the specified character is replaced by the same graphic reduced in size and elevated from the base line for a superscript character. If negative, processing continues in block 24 wherein the specified character is replaced by the same graphic reduced in size and depressed from the base line for a subscript character. Following the substitution operation performed by blocks 20 or 24, processing continues in block 21 wherein the substituted character is printed.

Following actual printing caused by block 21, processing continues in block 18 of FIG. 7, and the next command can be readied for processing.

In summary, a unique method of, and system for, handling text presentations involving moves from, and returns to, an established base line are provided in order to reduce operator attention and build an efficient presentation data stream which is independent of presentation techniques and devices. At the beginning of each line, a base line is established. Based on moves from this established base line for handling equations, and sub-/superscripting, a control sequence can be built including (a) direction and magnitude of the moves, and (b) returns, without regard to the formatting characteristics of the text such as line spacing, or the characteristics of the intended presentation device such as an absence of reverse indexing capabilities. The control sequence, when built, is for ultimately controlling a text presentation with a minimum of data stream coding.

While the invention has been particularly shown and described with reference to a preferred embodiment, it will be understood by those skilled in the art that various changes in form and detail may be made without departing from the spirit and scope of the invention.

I claim:

1. A method controlling text presentation base line movement, said method comprising building a data stream control sequence including direction of move, and magnitude of move without regard to text line spacing and including a precision control in said control sequence when cosmetic requirements are to be separated from physical requirements.

2. A method according to claim 1 including building said control sequence based on an established base line.

3. A method according to claim 2 including including a return in said control sequence for causing a return to said established base line without regard to said magnitude.

4. A method controlling text presentation base line movement to effect an aesthetically pleasing printout, said method comprising building a data stream control sequence including (1) a move direction, (2) a move magnitude without regard to text line spacing and (3) a return for causing a return to an established base line irrespective of the direction and magnitude of any previous moves and (4) a precision control in said control sequence when cosmetic requirements are to be separated from physical requirements.

* * * * *